R. STRAUBEL.
PHOTOGRAPHIC OBJECTIVE.
APPLICATION FILED MAR. 9, 1911.

1,025,766.

Patented May 7, 1912.

Witnesses:
Paul Krüger
Richard Kahn

Inventor:
Rudolf Straubel

UNITED STATES PATENT OFFICE.

RUDOLF STRAUBEL, OF JENA, GERMANY, ASSIGNOR TO THE FIRM OF CARL ZEISS, OF JENA, GERMANY.

PHOTOGRAPHIC OBJECTIVE.

1,025,766.  Specification of Letters Patent.  Patented May 7, 1912.

Application filed March 9, 1911. Serial No. 613,353.

*To all whom it may concern:*

Be it known that I, RUDOLF STRAUBEL, a citizen of the German Empire, residing at Carl-Zeiss strasse, Jena, in the Grand Duchy of Saxe-Weimar, Germany, have invented a new and useful Photographic Objective, of which the following is a specification.

The invention consists in an improvement of the photographic objectives shown and described in the English Patent 29447/1906. The invention described in that specification starts from a single objective adapted to a front diaphragm and formed of three lenses cemented together, of which two kinds were known, one having a biconvex and one a bi-concave middle lens. These two kinds represent a common type, because in either the cemented surface, which is convex toward the diaphragm, is collective, while on the other hand that, which is concave toward the diaphragm, is dispersive. The said older invention improved this type of objective in this way, that of the two differences of refractive index at the cemented surfaces (made approximately equal up to that time) the one at the collective cemented surface was given a predominant value. According to this rule it was necessary to aim at using for the front lens a glass having as low a refractive index as possible, a special drawback attendant on its employment being the fact, that those glasses which came nearest to fulfilling this condition proved to be not sufficiently durable. By the present invention not only this drawback is removed, but the front lens even receives a refractive index which is smaller than it was in any of the front lenses used up to now. This is attained by making the front lens of fused quartz.

Figure 1:
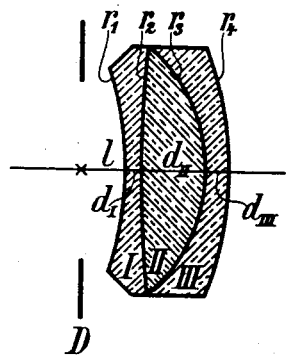
Figure 2:
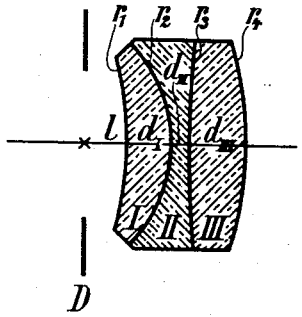
Figure 3:
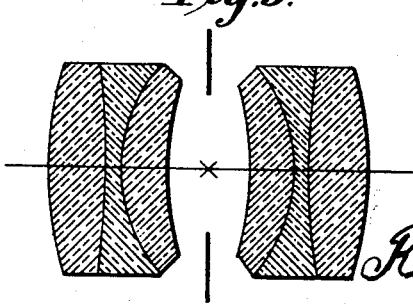

In the annexed drawing: Figure 1 is a section through a single photographic objective constructed according to the invention. Fig. 2 is a section through another form of such an objective. Fig. 3 is a section through a symmetrical double objective composed of two single objectives according to Fig. 2.

These two constructional examples correspond to the two types mentioned above. Both objectives are achromatic. The relative aperture in both cases amounts to approximately 1:12.

In the following tables the numerical values of the radii, the thicknesses and the distance from the diaphragm D correspond to a focal length 100. The kinds of glass are characterized by the refractive indices $n_D$ and (for the $H\gamma$-line of the hydrogen spectrum) $n_{G'}$.

FIG. 1.

*Radii, distance of diaphragm and thicknesses.*

$r_1 = -13.00$    $l = 1.76$
$r_2 = +52.71$   $d_I = 0.65$
$r_3 = -6.53$    $d_{II} = 2.61$
$r_4 = -13.71$   $d_{III} = 0.92$

*Kinds of glass.*

|  | $n_D$ | $n_{G'}$ |
|---|---|---|
| I | 1.45851 | 1.46694 |
| II | 1.58166 | 1.59561 |
| III | 1.62265 | 1.64337 |

FIG. 2.

*Radii, distance of diaphragm and thicknesses.*

$r_1 = -13.46$   $l = 1.70$
$r_2 = -5.79$    $d_I = 1.77$
$r_3 = +47.70$   $d_{II} = 0.68$
$r_4 = -14.50$   $d_{III} = 2.28$

*Kinds of glass.*

|  | $n_D$ | $n_{G'}$ |
|---|---|---|
| I | 1.45851 | 1.46694 |
| II | 1.49000 | 1.50116 |
| III | 1.61282 | 1.62613 |

I claim:

1. Single objective consisting of three lenses, having a collective cemented surface, convex toward the diaphragm, and a dispersive one, concave toward the diaphragm, and having further a greater difference of index at the collective than at the dispersive cemented surface, the outer lens which faces the diaphragm consisting of fused quartz.

2. Double objective comprising as a component a single objective consisting of three lenses, having a collective cemented surface, convex toward the diaphragm, and a dispersive one, concave toward the diaphragm, and having further a greater difference of index at the collective than at the dispersive cemented surface, the outer lens which faces the diaphragm consisting of fused quartz.

RUDOLF STRAUBEL.

Witnesses:
PAUL KRUGER,
RICHARD HAHN.